United States Patent
Feistauer et al.

(10) Patent No.: US 9,573,782 B2
(45) Date of Patent: Feb. 21, 2017

(54) METHOD FOR AUTOMATED POSITION DETECTION BY DEFINING AN EVALUATION REGION OF A REGISTER SENSOR

(71) Applicant: HEIDELBERGER DRUCKMASCHINEN AG, Heidelberg (DE)

(72) Inventors: Harald Feistauer, Feucht (DE); Eike Heitmann, Eppelheim (DE); Holger Leonhardt, Meckesheim (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 0 days.

(21) Appl. No.: 15/057,554

(22) Filed: Mar. 1, 2016

(65) Prior Publication Data
US 2016/0257514 A1 Sep. 8, 2016

(30) Foreign Application Priority Data
Mar. 2, 2015 (DE) .......... 10 2015 203 669

(51) Int. Cl.
*B65H 9/20* (2006.01)
*B41F 33/00* (2006.01)
*G01B 11/24* (2006.01)
*B41F 33/14* (2006.01)

(52) U.S. Cl.
CPC .......... *B65H 9/20* (2013.01); *B41F 33/0081* (2013.01); *B41F 33/14* (2013.01); *G01B 11/24* (2013.01); *B41P 2233/52* (2013.01); *B65H 2511/413* (2013.01); *B65H 2511/5125* (2013.01); *B65H 2553/40* (2013.01); *B65H 2553/41* (2013.01); *B65H 2553/42* (2013.01)

(58) Field of Classification Search
CPC .......... B65H 43/00; B65H 2511/413; B65H 2511/512; B65H 2511/5125; B65H 2553/40; B65H 2553/41; B65H 2553/42; B41F 33/14; B41F 33/0081; G01B 11/24; B41P 2233/52
See application file for complete search history.

(56) References Cited

U.S. PATENT DOCUMENTS

| | | | |
|---|---|---|---|
| 6,018,687 A | 1/2000 | Tabor | |
| 6,499,403 B1* | 12/2002 | Laulanet | B41F 33/0036 101/226 |
| 8,611,613 B2* | 12/2013 | Rauscher | B41F 33/0036 382/112 |
| 2011/0069166 A1* | 3/2011 | Rauscher | B41F 33/0036 348/125 |
| 2014/0284863 A1* | 9/2014 | Matsumoto | B65H 45/18 270/1.01 |

FOREIGN PATENT DOCUMENTS

| | | |
|---|---|---|
| DE | 10049752 A1 | 5/2001 |
| EP | 2128793 A1 | 12/2009 |

* cited by examiner

*Primary Examiner* — Patrick Cicchino
(74) *Attorney, Agent, or Firm* — Laurence A. Greenberg; Werner H. Stemer; Ralph E. Locher

(57) ABSTRACT

A method for defining an evaluation region of a register sensor for detecting register marks on printing substrates in printing substrate processing machines includes connecting the register sensor to a computer. In a first step, the register sensor measures an edge of a printing substrate, starting from the edge, the evaluation region is set to a starting value, and in at least one second step, the evaluation region is set to an increased value until the register sensor detects a first edge of the register mark.

10 Claims, 1 Drawing Sheet

METHOD FOR AUTOMATED POSITION DETECTION BY DEFINING AN EVALUATION REGION OF A REGISTER SENSOR

CROSS-REFERENCE TO RELATED APPLICATION

This application claims the priority, under 35 U.S.C. §119, of German Application DE 10 2015 203 669.3, filed Mar. 2, 2015; the prior application is herewith incorporated by reference in its entirety.

BACKGROUND OF THE INVENTION

Field of the Invention

The present invention relates to a method for automated position detection by defining an evaluation region of a register sensor for detecting register marks on printing substrates in printing substrate processing machines wherein the register sensor is connected to a computer.

Register sensors of this type for detecting sheet edges or register marks on printing substrates are in particular used in printing presses and sheet-fed die-cutting machines to control the positioning of the sheet-shaped printing substrates as they are fed to the machine, for instance. In most cases, optical sensors are used in this process. In order to be able to adjust the feeding and positioning of the printing substrates in the machine, it is necessary for the respective register mark to be accurately read. In this context, an aspect of particular importance is that the register mark needs to be accurately detected. For instance, no other edge such as an undesired varnishing edge must be mistaken for an edge of a register mark instead of the actual edge of the register mark. The mistaken interpretation as a register mark edge would inevitably lead to adjustment errors and significant measuring errors. In most cases, the operators of the machine do not realize such an error of adjustment and waste sheets are the result. One option of eliminating undesired edges is to have the register sensor scan specific areas of the printing substrate only. In the English language terminology, this specific area is also referred to as a region of interest (ROI). If the operator does not select a correct ROI, the results are the aforementioned adjustment errors and significant measuring errors.

SUMMARY OF THE INVENTION

It is accordingly an object of the invention to provide a method for automated position detection by defining an evaluation region of a register sensor for detecting register marks on printing substrates in printing substrate processing machines, which overcomes the hereinafore-mentioned disadvantages of the heretofore-known methods of this general type and which avoids adjustment errors caused by an operator.

With the foregoing and other objects in view there is provided, in accordance with the invention, a method for defining an evaluation region of a register sensor for detecting register marks on printing substrates in printing substrate processing machines. The method comprises connecting a computer to the register sensor, in a first step, using the register sensor to measure an edge of a printing substrate, starting from the edge of the printing substrate, setting the evaluation region to a starting value, and then in at least one second step, setting the evaluation region to an increased value until the register sensor detects a first edge of the register mark.

The present invention proposes to define the ROI in an automated way and to transmit it to the register sensor. For this purpose, the invention envisages the following provisions: connecting a register sensor to a computer, measuring an edge of a printing substrate by using the register sensor in a first step and, starting from the measured edge, setting the evaluation region to a starting value. This means that one border of the evaluation region (ROI) is the edge of the printing substrate, i.e. the sheet edge if the printing substrates are sheet-shaped. Then, in at least a second step, the evaluation region is set to an increased value. This value is increased until the register sensor detects a first edge of the register mark. This process of gradually approaching the first edge of the register mark ensures that the evaluation region will never be big enough to detect more than one edge of the register mark, for if the evaluation region was to include the opposite edge of the register mark, too, there would be the risk of the wrong edge of the register mark being taken as the reference value, causing the positioning of the printing substrate to be offset by the width of the register mark and consequently resulting in the production of waste sheets—a phenomenon that may also be referred to as "jumping."

In accordance with a first embodiment of the invention, a provision is made for a value of the evaluation region to be saved in the computer as a final value upon the detection of an edge of the register mark on the printing substrate, thus effectively saving the evaluation region. As soon as the register sensor detects the first edge of the register mark on the printing substrate, the evaluation region reaches its final size, which means that the value of the evaluation region is defined and may automatically be saved in the computer of the machine. In this way, the evaluation region is defined in an automated way and there is no risk for the operator to define a wrong evaluation region, in particular an evaluation region that is too wide and includes the opposite edge of the register mark, thus potentially causing errors in particular due to "jumping" to the wrong register mark edge.

In accordance with an advantageous further feature, a provision is made for the widening of the evaluation region to be carried out by the computer in a number of steps. In this case, a specific step width is defined in the computer, which is preferably smaller or much smaller than the usual width of a register mark. This ensures that when the evaluation region is widened by at least one step, this step is not wide enough for both the first edge and the opposite edge of the register mark to be detected after the step has been taken. Instead, these sufficiently small steps ensure that every additional step causes a maximum of one edge of the register mark to be detected. The pre-defined step width for the widening of the evaluation region is preferably saved in the control unit.

In accordance with a further embodiment of the invention, an additional provision is made for the evaluation region to be widened by a sidelay error of the machine for processing printing substrates. The widening of the evaluation region by a sidelay error of the machine for processing printing substrates ensures that at least the first edge of the register mark is detected even if the maximum acceptable sidelay error occurs in the machine for processing printing substrates. An important aspect in this context is to make sure that the value of the sidelay error to be taken into consideration is smaller than half the distance between the two edges of the register mark. This is the only way to ensure that even when the maximum sidelay error occurs in the machine, only precisely one edge, namely the first register mark edge located on the side of the sheet edge, is located within the evaluation region. This is a reliable way to prevent "jumping" between the two edges of the register mark.

In accordance with an advantageous further feature, a provision is made for an error signal to be generated whenever the machine for processing printing substrates is switched on and whenever a new print job is started in order for the computer to initiate the process of calibrating the register sensor to the evaluation region in a controlled way. As soon as the operator switches the machine on or calls up a new production job in the computer, the computer generates an error signal that prevents the production job from being carried out immediately. Instead, the error signal initiates the process of calibrating the register sensor to the evaluation region and the calibration process is carried out under the control of the computer.

This is done to ensure that whenever the machine is switched on and whenever a new production job is started, the first step always is to calibrate the register sensor to the evaluation region and to ensure that the operator is prevented from accidentally forgetting the calibration process. In this context, an exception may be envisaged, namely that the detected values of the evaluation region are saved in the computer in connection with the job to be processed to be accessible in the case of a repeat job. If such a repeat job is initiated, a new process of calibrating the register sensor to the evaluation region does not necessarily have to be carried out because instead the saved evaluation region values associated with the repeat job may immediately be accessed. In this case it is possible to skip the calibration process and yet at the same time to ensure that the correct evaluation region is set. A further embodiment of the invention includes a provision to ensure that for every new job, the target distance between the register mark and the edge of the printing substrate is obtained from pre-press data associated with the production job and compared to the defined evaluation region in the computer.

The target distance between the register mark and the edge of the printing substrate may easily be obtained from the pre-press data and may be read into the computer. In theory, this distance ought to be identical with the defined evaluation region that extends precisely up to the first outer edge of the register mark. When deviations that exceed acceptable tolerances are detected in this comparison, it is to be assumed that the detection of the edge of the register mark has been incorrect and that potentially a different edge, for instance a varnish edge, has erroneously been detected. Thus a comparison with pre-press data acts as a plausibility check and assists in preventing an erroneous detection of an edge of the register mark.

In accordance with a further embodiment of the present invention, a provision is made initially to define the evaluation region by detecting the first edge of the register mark, then to suppress this evaluation region by using the computer and to take another measurement, and then to widen the evaluation region as the second evaluation region until the next edge of the register mark is detected. In this case, it is not only the first, outer edge of the register mark that is detected but also the second, inner edge.

The method of the invention is suitable for adjusting register sensors to the evaluation region in terms of the longitudinal, circumferential, and diagonal register. In accordance with an advantageous aspect, a provision is made for the sensor to be automatically adjusted to the evaluation region by using an electric drive motor in a fully automated way under the control of the computer. In this case the computer emits corresponding signals to the drive motor to position the sensor in such a way that the evaluation region is gradually widened until the first edge of the register mark is detected. In this case the method may be implemented in a fully automated way without operator intervention.

Other features which are considered as characteristic for the invention are set forth in the appended claims.

Although the invention is illustrated and described herein as embodied in a method for automated position detection by defining an evaluation region of a register sensor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
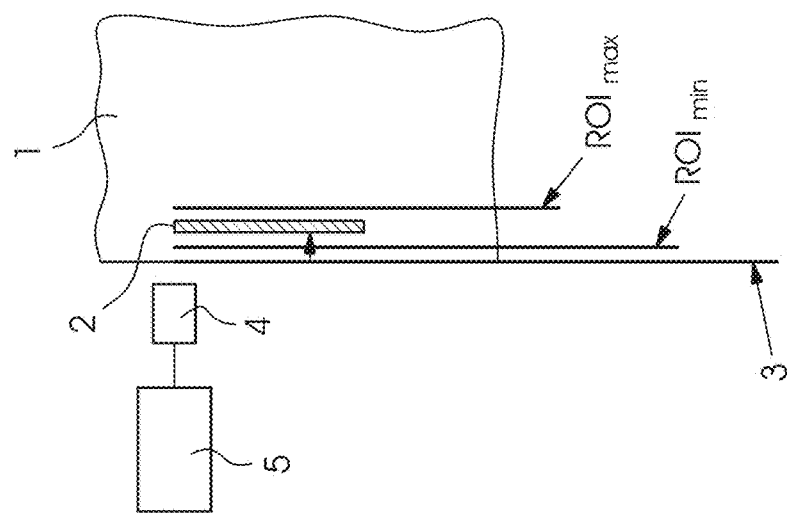
FIG. 1 is a fragmentary, diagrammatic, plan view of a substrate and a sensor illustrating a method of the prior art.

Referring now to the figures of the drawings in detail and first, particularly, to FIG. 1 thereof, there is seen a sheet-shaped printing substrate 1 onto which a register mark 2 has been printed. The register mark 2 has a specific width and is laterally bordered by two edges that are generally parallel to the edge of the sheet 1. A register sensor 4 is provided to detect the sheet edge 3 and the register mark 2. The register sensor 4 is connected to a control unit 5 of the machine for processing printing substrates. In accordance with the prior art, in order to define an evaluation region ROI, the evaluation region ROI is adjusted directly from a minimum ROI value $ROI_{min}$ to a maximum ROI value $ROI_{max}$. However, a risk inherent in that process is that both edges of the register mark 2 may be located in the evaluation region ROI, causing two edges of the register mark 2 to be detected. If the wrong edge of the register mark 2 is taken as a reference for the alignment of the sheet 1, the processing steps are carried out incorrectly because the sheet 1 is in the wrong position in the machine for processing printing substrates. The result is the production of waste.

Figure 2:
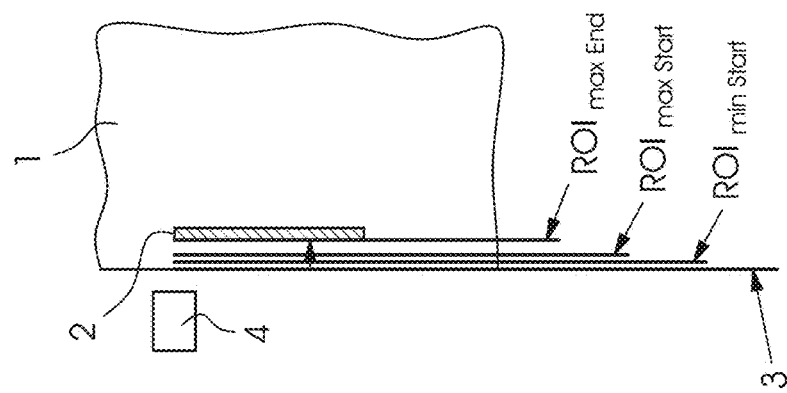
FIG. 2 is a fragmentary plan view of a substrate and a sensor illustrating the method of the invention without factoring in a sidelay error of a machine for processing printing substrates.

That problem is overcome by the method of the invention shown in FIG. 2. In FIG. 2, the evaluation region of the register sensor 4 is gradually widened, starting at the smallest ROI value $ROI_{min\ start}$ until the first edge of the register mark 2 is detected. This value is then saved as the highest acceptable ROI end value $ROI_{max\ end}$ and ensures that only the first, outer edge of the register mark 2 is located in the evaluation region ROI. This reliably prevents the detection of both edges of the register mark 2 and the occurrence of jumps by the width of the register mark. The starting value of this process is between the lowest ROI starting value $ROI_{min\ start}$ and the maximum ROI starting value $ROI_{max\ start}$. Both of these values are located between the sheet edge 3 and the register mark 2 so that no edge of the register mark 2 is detected at the beginning. As the evaluation region ROI is widened, the first edge of the register mark 2 will eventually be detected and the process will be stopped. The value that is determined in this way is then saved in the control unit 5 as the maximum ROI end value $ROI_{max\ end}$ and based thereon, the maximum acceptable evaluation region ROI that is to be used for the processing of the production job is saved in the control unit 5.

Figure 3:
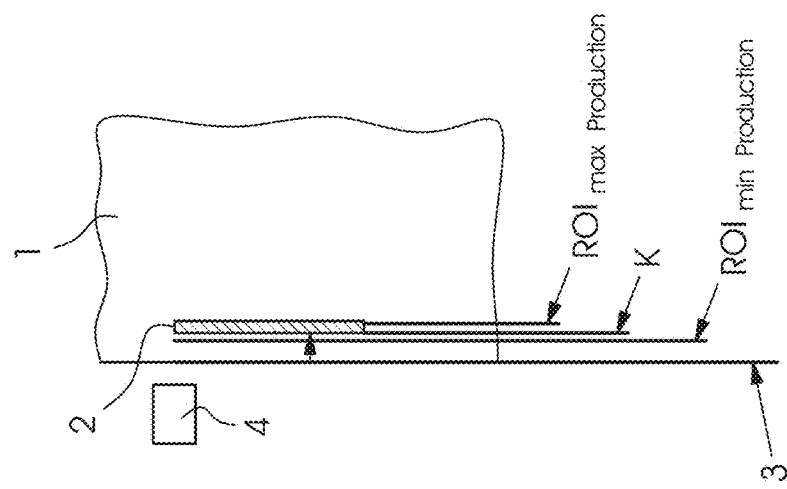
FIG. 3 is a fragmentary plan view of a substrate and a sensor illustrating the method of the invention while taking into consideration the sidelay error of the machine for processing printing substrates.

In accordance with a further embodiment of the present invention shown in FIG. 3, a provision is made for the sidelay error of the machine for processing printing substrates to be taken into consideration. If this is done, however, it has to be ensured that the maximum acceptable sidelay error of the machine for processing printing substrates is smaller than one half of the width of the register mark 2 because otherwise jumps between the two edges of the register mark 2 may occur. In this process, the maximum ROI end value $ROI_{max\ end}$ that has previously been determined in FIG. 2 is saved as a measured edge position K and, starting from the measured edge position K, a lowest ROI value during production $ROI_{min\ production}$ is defined, which is calculated as the position of the edge K minus the maximum sidelay error, whereas the maximum ROI value during production $ROI_{max\ production}$ is calculated as the position of the edge K plus the maximum sidelay error. Thus the evaluation region ROI is located between the minimum ROI value during production $ROI_{min\ production}$ and the maximum ROI value during production $ROI_{max\ production}$, ensuring that it is always only the one outer edge of the register mark 2 that is located within the evaluation region ROI to effectively prevent jumps in the detection of the edge of the register mark 2.

The invention claimed is:

1. A method for defining an evaluation region of a register sensor for detecting register marks on printing substrate processing machines, wherein the register sensor is connected to a computer, the method comprising the following steps:
   in a first step, using the register sensor to measure an edge of a printing substrate;
   starting from the edge of the printing substrate, setting the evaluation region to a starting value; and
   then in at least one second step, setting the evaluation region to an increased value until the register sensor detects a first edge of the register mark.

2. The method according to claim 1, which further comprises saving a value of the evaluation region as an end value in the computer when an edge of the register mark is detected on the printing substrate, thus saving the evaluation region.

3. The method according to claim 1, which further comprises using the computer to widen the evaluation region in a plurality of steps.

4. The method according to claim 3, which further comprises widening the evaluation region by a sidelay error of the machine for processing printing substrates.

5. The method according to claim 4, wherein a value of the sidelay error being taken into consideration is smaller than one half of a distance between two edges of the register mark.

6. The method according to claim 1, which further comprises whenever the machine for processing printing substrates is switched on and for every new job, generating an error signal in the computer to initiate a process of calibrating the register sensor to the evaluation region under control of the computer.

7. The method according to claim 1, which further comprises for every new job, obtaining a target distance between the register mark and the edge of the printing substrate from pre-press data belonging to the job and comparing the target distance to the defined evaluation region in the computer.

8. The method according to claim 1, which further comprises saving the determined values for the evaluation region on the computer in connection with a respective job to be carried out and making the determined values accessible in the case of a repeat job.

9. The method according to claim 1, which further comprises:
   initially defining the evaluation region by detecting a first edge of the register mark;
   then using the computer to suppress the evaluation region and carrying out another measurement; and
   increasing the evaluation region as a second evaluation region until detecting the next edge of the register mark.

10. The method according to claim 9, which further comprises:
   comparing the second evaluation region minus a distance between the edge of the printing substrate and the first edge of the register mark to a width of the register mark as obtained from pre-press data; and
   generating a control signal for the machine for processing printing substrates or a signal to be output to an operator, if deviations occur between the width of the register mark as it has been determined from measurements on the printing substrate by using the register sensor and the width of the register mark as it has been obtained from the pre-press data.

* * * * *